US012629591B2

(12) United States Patent　　　(10) Patent No.:　US 12,629,591 B2

Pan　　　　　　　　　　　　　　　 (45) Date of Patent:　　May 19, 2026

(54) METHOD AND APPARATUS FOR PROCESSING CLOUD GAMING RESOURCE DATA, COMPUTER DEVICE, AND STORAGE MEDIUM

(71) Applicant: Tencent Technology (Shenzhen) Company Limited, Guangdong (CN)

(72) Inventor: Boyuan Pan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 241 days.

(21) Appl. No.: 18/239,670

(22) Filed: Aug. 29, 2023

(65) Prior Publication Data

US 2023/0405455 A1　　Dec. 21, 2023

Related U.S. Application Data

(63) Continuation of application No. PCT/CN2023/072004, filed on Jan. 13, 2023.

(30) Foreign Application Priority Data

Feb. 7, 2022　　(CN) .......................... 202210115787.0

(51) Int. Cl.
　　A63F 13/355　　　(2014.01)
　　A63F 13/335　　　(2014.01)
　　　　　　(Continued)

(52) U.S. Cl.
　　CPC .......... A63F 13/355 (2014.09); A63F 13/335 (2014.09); A63F 13/493 (2014.09);
　　　　　　(Continued)

(58) Field of Classification Search
　　CPC ........ A63F 13/355; A63F 13/45; A63F 13/52; A63F 13/55; A63F 13/493; A63F 13/60;
　　　　　　(Continued)

(56) References Cited

U.S. PATENT DOCUMENTS

2008/0268961　A1 *　10/2008　Brook ................... A63F 13/355
　　　　　　　　　　　　　　　　　463/42
2018/0126275　A1 *　5/2018　Sherr ...................... G06T 13/40
2019/0314728　A1 *　10/2019　Sullivan ............... A63F 13/355

FOREIGN PATENT DOCUMENTS

CN　　　　113181646　A　　7/2021
CN　　　　114404960　A　　4/2022

OTHER PUBLICATIONS

International Search Report issued Apr. 14, 2023 in Application No. PCT/CN2023/072004, with English Translation, pp. 1-11.

* cited by examiner

*Primary Examiner* — Omkar A Deodhar

(74) *Attorney, Agent, or Firm* — ARENTFOX SCHIFF LLP

(57)　　　　　　ABSTRACT

In a method for processing content of a cloud game, a cutscene is determined to be displayed in an instance of a cloud game. Cutscene identification information is generated based on the determination that the cutscene is to be displayed in the instance of the cloud game. The cutscene identification information indicates that the cutscene to be displayed. The cutscene identification information of the cutscene is sent to a cutscene server, which is configured to send cutscene data of the cutscene to a terminal device for display based on the cutscene identification information. The content of the instance of the cloud game to be displayed after the cutscene is rendered based on an end of the display of the cutscene. The rendered content is outputted to the terminal device for display after the display of the cutscene.

20 Claims, 9 Drawing Sheets

(51) Int. Cl.
   *A63F 13/493*          (2014.01)
   *A63F 13/52*           (2014.01)
   *A63F 13/61*           (2014.01)
(52) U.S. Cl.
   CPC .............. *A63F 13/52* (2014.09); *A63F 13/61*
                     (2014.09); *A63F 2300/538* (2013.01)
(58) Field of Classification Search
   CPC .. A63F 13/70; A63F 13/335; A63F 2300/207;
                     A63F 2300/538; A63F 2300/57
   See application file for complete search history.

Obtain, in a case that a current game process satisfies a cutscene insertion condition, a to-be-inserted cutscene data identifier that matches the insertion condition, and generate a resource distribution instruction

202

Transmit the resource distribution instruction and the cutscene data identifier to a resource distribution server, the resource distribution instruction indicating that the resource distribution server needs to obtain cutscene data corresponding to the cutscene data identifier from a pre-stored static resource library through matching and transmit the cutscene data to a terminal device for display

204

Render cloud gaming resource data of the current game process and output the data to the terminal device for display in a case that it is determined that playback of the cutscene data ends

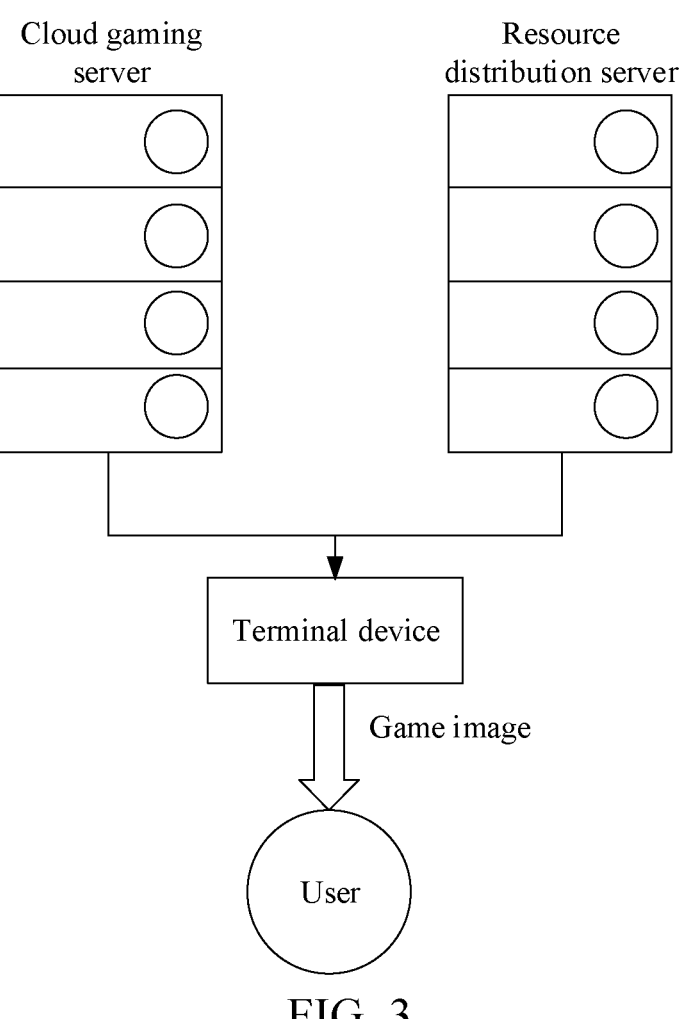

FIG. 3

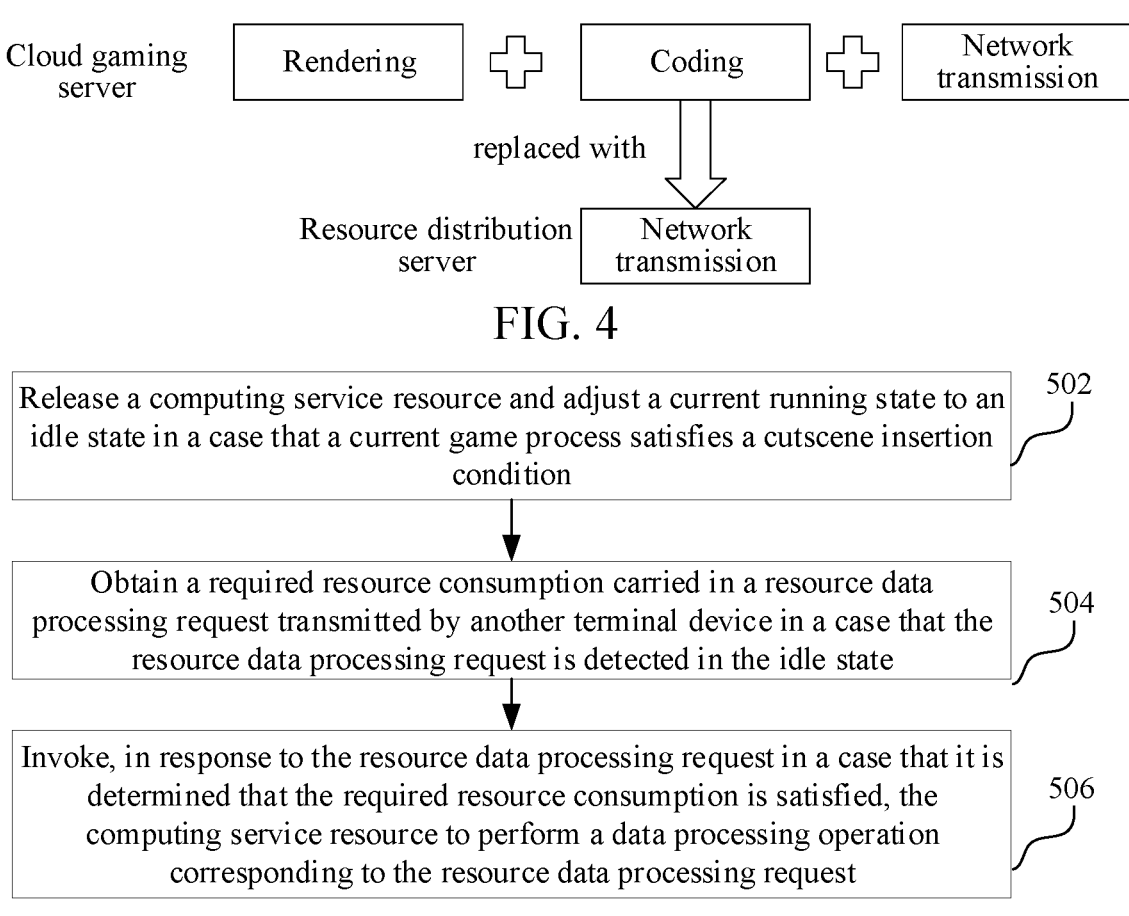

FIG. 4

Release a computing service resource and adjust a current running state to an idle state in a case that a current game process satisfies a cutscene insertion condition — 502

Obtain a required resource consumption carried in a resource data processing request transmitted by another terminal device in a case that the resource data processing request is detected in the idle state — 504

Invoke, in response to the resource data processing request in a case that it is determined that the required resource consumption is satisfied, the computing service resource to perform a data processing operation corresponding to the resource data processing request — 506

FIG. 5

Cloud gaming server

Enter a cutscene stage suspend an operation, and release a resource

...
Resource data processing request

In the game operation
Output an image

Game user 1

Game user 2

Game user 3

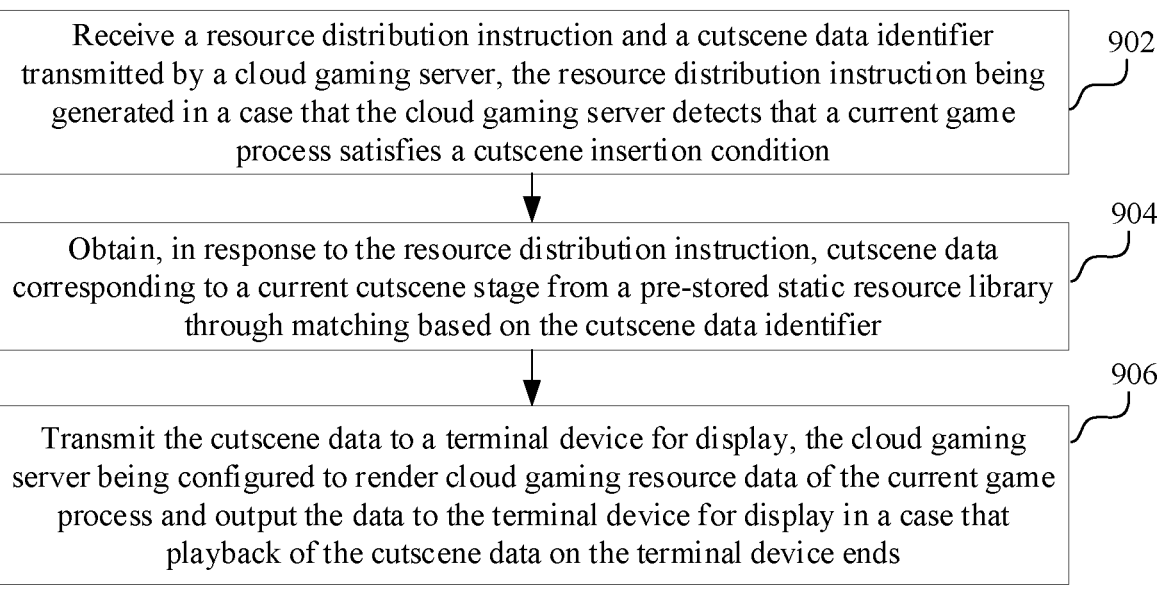

Receive a resource distribution instruction and a cutscene data identifier transmitted by a cloud gaming server, the resource distribution instruction being generated in a case that the cloud gaming server detects that a current game process satisfies a cutscene insertion condition 902

Obtain, in response to the resource distribution instruction, cutscene data corresponding to a current cutscene stage from a pre-stored static resource library through matching based on the cutscene data identifier 904

Transmit the cutscene data to a terminal device for display, the cloud gaming server being configured to render cloud gaming resource data of the current game process and output the data to the terminal device for display in a case that playback of the cutscene data on the terminal device ends 906

FIG. 9

METHOD AND APPARATUS FOR PROCESSING CLOUD GAMING RESOURCE DATA, COMPUTER DEVICE, AND STORAGE MEDIUM

RELATED APPLICATIONS

This application is a continuation of International Application No. PCT/CN2023/072004, filed on Jan. 13, 2023, which claims priority to Chinese Patent Application No. 202210115787.0, filed on Feb. 7, 2022 and entitled "METHOD AND APPARATUS FOR PROCESSING CLOUD GAMING RESOURCE DATA, COMPUTER DEVICE, AND STORAGE MEDIUM." The entire disclosures of the prior application are incorporated herein by reference.

FIELD OF THE TECHNOLOGY

Embodiments of this disclosure relate to the field of cloud technologies, including to a method and an apparatus for processing cloud gaming resource data, a computer device, and a storage medium.

BACKGROUND OF THE DISCLOSURE

In response to the development of cloud technologies, cloud gaming technology appeared. The cloud gaming technology includes a game mode that is based on cloud computing, uses a server to render a game image, and only displays a game mode on a client, which belongs to an online game mode. In a cloud gaming mode, a user is not required to download and install a specific game program at a terminal, and can play a game directly through network transmission.

Cutscenes in a plurality of games are played directly in a game. Since cloud gaming executes the game on the cloud gaming server, a playback operation of a corresponding cutscene also needs to rely on a cloud gaming server for an output of the cutscene in the cloud gaming. That is to say, same cutscene content also needs to be repeatedly rendered, coded, and outputted to play on the cloud gaming server during the game. As a result, a computing resource of the cloud gaming server is occupied by the output of repeated cutscenes, a resource waste is caused, and a utilization efficiency of the computing resource of the cloud server can be low.

SUMMARY

According to embodiments provided in this disclosure, a method and an apparatus for processing cloud gaming resource data, a computer device, and a non-transitory computer-readable storage medium are provided.

According to a first aspect, a method for processing content of a cloud game is provided. The method is performed by a server for example. In the method, a cutscene is determined to be displayed in an instance of a cloud game. Cutscene identification information is generated based on the determination that the cutscene is to be displayed in the instance of the cloud game. The cutscene identification information indicates that the cutscene to be displayed. The cutscene identification information of the cutscene is sent to a cutscene server, which is configured to send cutscene data of the cutscene to a terminal device for display based on the cutscene identification information. The content of the instance of the cloud game to be displayed after the cutscene is rendered based on an end of the display of the cutscene. The rendered content is outputted to the terminal device for display after the display of the cutscene.

According to a second aspect, a method for processing a cutscene in a cloud game is provided. The method is performed by a server for example. In the method, cutscene identification information of the cutscene that is to be displayed in an instance of a cloud game is received from a cloud gaming server. The cutscene identification information indicates the cutscene to be displayed. The cloud gaming server is configured to render content of the instance of the cloud game. Cutscene data corresponding to the cutscene is obtained based on the cutscene identification information. The cutscene data is sent to a terminal device for display. The cloud gaming server is configured to render of the content of the instance of the cloud game to be displayed after the cutscene on the terminal device.

According to a third aspect, an apparatus for processing content of a cloud game is provided. The apparatus includes processing circuitry that is configured to determine a cutscene is to be displayed in an instance of a cloud game. The processing circuitry is configured to generate cutscene identification information based on the determination that the cutscene is to be displayed in the instance of the cloud game. The cutscene identification information indicates the cutscene to be displayed. The processing circuitry is configured to send the cutscene identification information of the cutscene to a cutscene server. The cutscene server is configured to send cutscene data of the cutscene to a terminal device for display based on the cutscene identification information. The processing circuitry is configured to render the content of the instance of the cloud game to be displayed after the cutscene based on an end of the display of the cutscene. The processing circuitry is configured to output the rendered content to the terminal device for display after the display of the cutscene.

According to a second aspect, an apparatus for processing a cutscene in a cloud game is provided. The apparatus includes processing circuitry that is configured to receive cutscene identification information of the cutscene that is to be displayed in an instance of a cloud game from a cloud gaming server. The cutscene identification information indicates the cutscene to be displayed. The cloud gaming server is configured to render content of the instance of the cloud game. The processing circuitry is configured to obtain cutscene data corresponding to the cutscene based on the cutscene identification information. The processing circuitry is configured to send the cutscene data to a terminal device for display. The cloud gaming server is configured to render of the content of the instance of the cloud game to be displayed after the cutscene on the terminal device.

According to a fifth aspect, a computer device is provided, including: a memory and a processor, the memory storing computer-readable instructions, and the processor, when executing the computer-readable instructions, implementing methods such as the first aspect or the implementation thereof or the second aspect or the implementation thereof.

According to a sixth aspect, a non-transitory computer-readable storage medium is provided, storing computer-readable instructions. The computer-readable instructions, when executed by a processor, implement methods such as the first aspect or the implementation thereof or the second aspect or the implementation thereof.

According to a seventh aspect, a computer program product is provided, including computer-readable instructions. The computer-readable instructions, when executed by the processor, implement methods such as the first aspect or the implementation thereof or the second aspect or the implementation thereof.

Details of one or more embodiments of this disclosure are provided in the accompanying drawings and descriptions below. Other features, objectives, and advantages of this disclosure become apparent from the specification, the drawings, and the claims.

BRIEF DESCRIPTION OF THE DRAWINGS

To describe the technical solutions in the embodiments of this disclosure more clearly, the following briefly describes the accompanying drawings for describing the embodiments. The accompanying drawings in the following descriptions show merely exemplary embodiments of this disclosure. Other embodiments and modifications are within the scope of the present disclosure.

FIG. 2 is a schematic flowchart of a method for processing cloud gaming resource data according to an embodiment.

FIG. 3 is a schematic diagram of deployment of a cloud gaming server and a resource distribution server according to an embodiment.

FIG. 4 is a schematic diagram of a division of labor between a cloud gaming server and a resource distribution server according to an embodiment;

FIG. 5 is a schematic flowchart of a method for processing cloud gaming resource data according to another embodiment.

FIG. 6 is a schematic diagram of a computing service resource invocation of a cloud gaming server according to an embodiment.

FIG. 9 is a schematic flowchart of a method for processing cloud gaming resource data according to still another embodiment.

DESCRIPTION OF EMBODIMENTS

Technical solutions in embodiments of this disclosure are described in the following with reference to the accompanying drawings in the embodiments of this disclosure. The described embodiments are merely some rather than all of the embodiments of this disclosure. Other embodiments shall fall within the scope of this disclosure.

A method for processing cloud gaming resource data provided by embodiments of this disclosure relates to cloud technology. The cloud technology is, for example, a hosting technology that unifies a series of resources such as hardware, software, and networks in a wide area network or a local area network to realize calculation, storage, processing, and sharing of data. The cloud technology can refer to a network technology, an information technology, an integration technology, a platform management technology, and an application technology applied based on a cloud computing business model. The cloud technology may form a resource pool and be used on demand, which is flexible and convenient. A cloud computing technology is expected to be become an important support. Background services of a technology network system require a lot of computing and storage resources, such as a video website, a picture website, and more portal websites. With a high development and application of an Internet industry, each item may have its own identification mark in the future, which is required to be transmitted to a background system for logical processing. Data of different levels will be processed separately, and all kinds of industry data requires a strong system backing support, which can be better achieved by using the cloud computing.

A cloud gaming, also referred to as gaming on demand, includes an online gaming technology based on the cloud computing technology. The cloud gaming technology can enable a client, such as thin client with relatively limited graphics processing and data computing capabilities, to run a high-quality game. In a cloud gaming scenario, the game is run on the cloud server rather than a game terminal of a player, and the cloud server renders the game scenario into a video and audio stream, and transmits the video and audio stream to the game terminal of the player by using the network. The game terminal of the player may not be required to have powerful graphics computing and data processing capabilities, but is only required to have a basic streaming media playback capability and the capability of acquiring instructions inputted by the player and sending the instructions to the cloud server.

Figure 1:
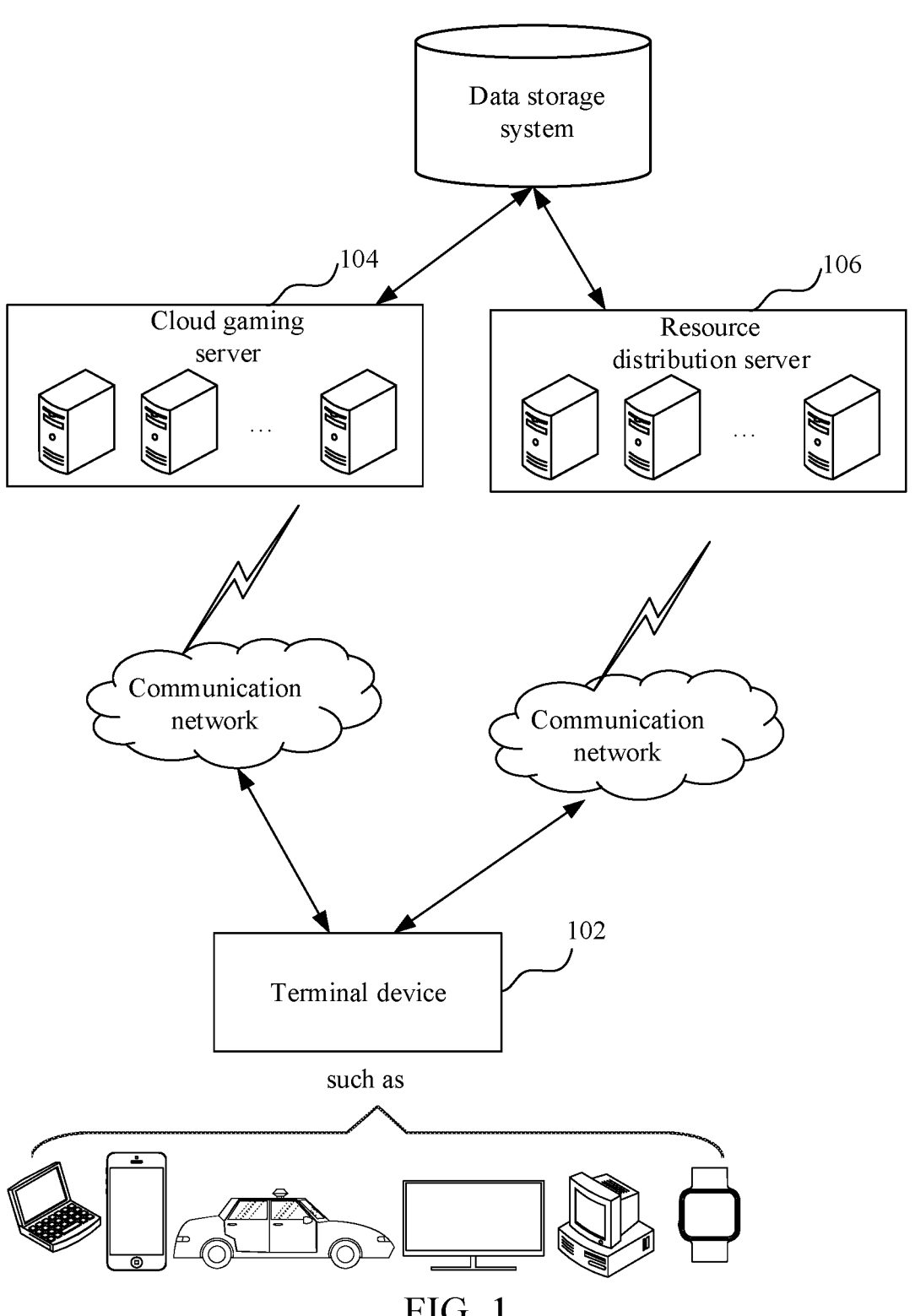
FIG. 1 is an application environment diagram of a method for processing cloud gaming resource data according to an embodiment.

The method for processing cloud gaming resource data provided by embodiments of this disclosure relates to the cloud gaming technology in the cloud technology, which may be applied to an application environment shown in FIG. 1. A terminal device 102 communicates with a cloud gaming server 104 and a resource distribution server 106 by using a network. A data storage system may store data to be processed by the server 104 and the resource distribution server 106. The data storage system may be integrated on the server 104, the resource distribution server 106, or may be placed on a cloud or another network server. The cloud gaming server 104 and the resource distribution server 106 may be independent physical servers, server clusters formed by a plurality of physical servers, distributed systems, or cloud servers that provide basic cloud computing services such as a cloud service, a cloud database, cloud computing, a cloud function, cloud storage, a network service, cloud communication, a middleware service, a domain name service, a security service, a CDN, big data, and an artificial intelligence platform. The terminal device 102 may be a smartphone, a tablet computer, a notebook computer, a desktop computer, a smart speaker, a smartwatch, or the like, but is not limited thereto. The terminal and the server may be directly or indirectly connected through wired or wireless communication, which is not limited in this disclosure.

Embodiments of this disclosure may be applicable to various scenarios, including but not limited to cloud technology and the like.

Further, the cloud gaming server 104 and the resource distribution server 106 may be separately configured to execute the method for processing cloud gaming resource data provided by embodiments of this disclosure. The terminal device 102, the cloud gaming server 104, and the resource distribution server 106 may also be collaboratively configured to perform the method for processing cloud gaming resource data provided by embodiments of this disclosure. For example, that the terminal device 102, the cloud gaming server 104, and the resource distribution server 106 may be collaboratively configured to perform the method for processing cloud gaming resource data provided by embodiments of this disclosure is used as an example. When the cloud gaming server 104 detects that a current game process satisfies a cutscene insertion condition, a to-be-inserted cutscene data identifier that matches an insertion condition is obtained and a resource distribution instruction is generated, and the resource distribution instruction and the cutscene data identifier are transmitted to the resource distribution server 106. The resource distribution server 106 is configured to obtain cutscene data corresponding to the cutscene data identifier from memory, such as a pre-stored static resource library or database, through matching based on the resource distribution instruction, and transmit the cutscene data to the terminal device 102 for display. Further, the cloud gaming server 104 being configured to render the cloud gaming resource data of the current game process and outputting the data to the terminal device 102 for display in a case that playback of the cutscene data on the terminal device 102 ends.

Similarly, that the terminal device 102, the cloud gaming server 104, and the resource distribution server 106 may be collaboratively configured to perform the method for processing cloud gaming resource data provided by embodiments of this disclosure is used as an example. The resource distribution server 106 is configured to obtain the cutscene data corresponding to a current cutscene stage from a pre-stored static resource library through matching based on the cutscene data identifier, by receiving the resource distribution instruction and the cutscene data identifier transmitted by the cloud gaming server 104 and in response to the resource distribution instruction. The resource distribution instruction is generated in a case that the cloud gaming server 104 detects that a current game process satisfies a cutscene insertion condition. Further, the resource distribution server 106 transmits the cutscene data to the terminal device 102 for display, the cloud gaming server 104 being configured to render the cloud gaming resource data of the current game process and outputting the data to the terminal device 102 for display in a case that playback of the cutscene data on the terminal device ends.

In an embodiment, as shown in FIG. 2, a method for processing cloud gaming resource data is provided. This embodiment is described with an example in which the method is applied to the cloud gaming server in FIG. 1, and the method includes the following steps.

Step S202: Obtain in a case that a current game process satisfies a cutscene insertion condition, a to-be-inserted cutscene data identifier that matches the insertion condition, and generate a resource distribution instruction. In an example, a cutscene is determined to be displayed in an instance of a cloud game. Cutscene identification information is generated based on the determination that the cutscene is to be displayed in the instance of the cloud game. The cutscene identification information indicates that the cutscene to be displayed.

For example, when the cloud gaming server detects that the current game process satisfies the cutscene insertion condition, a to-be-inserted cutscene identifier that matches an insertion condition is obtained, that the cutscene insertion condition is satisfied includes at least one of: the current game process enters a cutscene stage, a cutscene playback button is triggered by a game user, and an animation insertion logic built in a program that is currently normally running is detected. When any one of the conditions occurs, it can be determined that the cutscene insertion condition is satisfied.

The cutscene data identifier corresponds to the cutscene data to be inserted or played. The cutscene data may be cutscenes corresponding to a current game instance to which the current game process belongs, or may be advertising data to be served.

Further, when it is determined that the current game process satisfies the cutscene insertion condition, the cutscene stage is necessarily to be entered. That is to say, the playback of the cutscene does not require the cloud gaming server to render, code, and transmit in real time. That is, a processing operation of the cloud gaming server needs to be suspended, but the manner of generating a resource distribution instruction and transmitting the resource distribution instruction to the resource distribution server is used. The cutscene data that matches the cutscene data identifier is instructed by the resource distribution server through the resource distribution instruction and transmitted to the terminal device for display and for a user to view.

In an embodiment, rendering and outputting operations for the cloud gaming resource data of the current game process are suspended in a case that the current game process satisfies the cutscene insertion condition.

For example, since when the current game process satisfies the cutscene insertion condition, it represents that the current game process enters the cutscene stage. That is, the cloud gaming server needs to suspend the rendering, coding, and output operations of the cloud gaming resource. The currently occupied computing service resource can be released for another terminal device to invoke.

In an embodiment, after the obtaining, in a case that a current game process satisfies a cutscene insertion condition, a to-be-inserted cutscene data identifier that matches the insertion condition, and generating a resource distribution instruction, the method further includes determining a corresponding game instance based on the current game process, and obtaining a cutscene requirement corresponding to the game instance; determining a to-be-played image that matches the insertion condition based on the cutscene requirement; and obtaining a cutscene data identifier corresponding to the to-be-played image, and adding the cutscene data identifier to the resource distribution instruction.

For example, after the obtaining, in a case that a current game process satisfies a cutscene insertion condition, a to-be-inserted cutscene data identifier that matches the insertion condition, and generating a resource distribution instruction, the game instance is further determined based on the current game process, so as to determine the cutscene data that currently needs to be played based on the game instance.

A cutscene requirement corresponding to the current game process may be determined based on the game instance, and a to-be-played image that matches the insertion condition based on the cutscene requirement is determined. For example, it is necessary to determine which game instance the current game process belongs to in the cutscene stage, and obtain the cutscene requirement corresponding to the game instance. It is determined which image or video is currently to be played based on the cutscene requirement.

Further, after a to-be-played image that matches the insertion condition is determined, the cutscene data identifier corresponding to the to-be-played image is further obtained, and the cutscene data identifier is added to the resource distribution instruction. In a case that the cutscene data identifier is carried in the resource distribution instruction and the resource distribution instruction is transmitted to the resource distribution server, the resource distribution server may obtain the cutscene data identifier carried based on the resource distribution instruction, so as to obtain the corresponding cutscene data through matching based on the cutscene data identifier.

Step S204: Transmit the resource distribution instruction and the cutscene data identifier to a resource distribution server, the resource distribution instruction indicating that the resource distribution server needs to obtain cutscene data corresponding to the cutscene data identifier from a pre-stored static resource library through matching and transmit the cutscene data to a terminal device for display. In an example, the cutscene identification information of the cutscene is sent to a cutscene server, which is configured to send cutscene data of the cutscene to a terminal device for display based on the cutscene identification information.

For example, the cloud gaming server transmits the resource distribution instruction and the cutscene data identifier to the resource distribution server. The resource distribution server responds to the resource distribution instruction, and obtains the cutscene data corresponding to the cutscene data identifier from the pre-stored static resource library through matching based on the received cutscene data identifier.

After the resource distribution server determines the matching cutscene data based on the cutscene data identifier, the cutscene data is transmitted to the terminal device for display, so as to achieve seamless switching between the cutscene and the game image, and avoid a problem that game user needs to wait for a blank page or a buffer page.

Further, the resource distribution server and the cloud gaming server are connected to the terminal device. The cloud gaming server is configured to feed back a game operating stage to the terminal device and render the coded game image based on the cloud game resource. The resource distribution server is configured to transmit pre-stored cutscene data to the terminal device for display for the user to view. The cloud gaming server may transmit notification information to the terminal device to obtain the cutscene data from the resource distribution server when it is determined that the current game process meets the cutscene insertion condition and enters the cutscene stage. That is, in the cutscene stage, the cloud gaming server suspends an operation, the resource distribution server transmits the cutscene data from the terminal device, and the terminal device receives the cutscene data for display.

In an embodiment, as shown in FIG. 3, a schematic diagram of deployment of a cloud gaming server and a resource distribution server is provided. It may be recognized from FIG. 3 that the resource distribution server and the cloud gaming server are connected to the terminal device. The cloud gaming server is configured to feed back a game operating stage to the terminal device and render the coded game image based on the cloud game resource. The game user does not directly affect which image is to be played. For example, if a cutscene that is forced to be played out exists, no matter how the game user is operated, the uninterruptible cutscene data is played in its entirety without being affected by the game user. The cutscene data that can be interrupted enters a next play point or exits the play after being interrupted and a game running state resumes.

In an embodiment, after the rendering cloud gaming resource data of the current game process and outputting the data to the terminal device for display in a case that it is determined that playback of the cutscene data ends, the method further includes receiving a running recovery instruction transmitted by the resource distribution server in a case that it is determined that playback of the cutscene data ends; recovering rendering and coding operations for the cloud gaming resource data of the current game process during a game operating stage in response to the running recovery instruction; and obtaining game image data based on the rendering and coding operations, and transmitting the game image data to the terminal device for display.

For example, the resource distribution server triggers a running recovery instruction and transmits the running recovery instruction to the cloud gaming server in a case that it is determined that playback of the cutscene data on the terminal device ends, and recovers, in a case that the cloud gaming service receive a running recovery instruction transmitted by the resource distribution server, rendering and coding operations for the cloud gaming resource data of the current game process during a game operating stage in response to the running recovery instruction.

Further, after the cloud gaming server resumes the rendering and coding operation of the cloud gaming resource data of the current game process, the game image data is further obtained based on the rendering and coding operation, and the game image data is transmitted to the terminal device for display during the game.

In the above method for processing cloud gaming resource data, when the current game process satisfies the cutscene insertion condition, a to-be-inserted cutscene data identifier that matches an insertion condition is obtained and a resource distribution instruction is generated, and the resource distribution instruction and the cutscene data identifier are transmitted to the resource distribution server, the resource distribution instruction indicating that the resource distribution server needs to obtain cutscene data corresponding to the cutscene data identifier from a pre-stored static resource library through matching and transmit the cutscene data to a terminal device for display; and rendering cloud gaming resource data of the current game process and outputting the data to the terminal device for display in a case that it is determined that playback of the cutscene data ends. Since the cloud gaming server is not required to render and code the cutscene data in real time, and the cutscene data to be played is directly transmitted through the resource distribution server, the computing service resource occupation of the cloud gaming server can be reduced. Further, a separate processing of the cutscene data and the cloud gaming resource data is realized, so as to avoid repeated cutscene data occupying a large amount of service computing resources, reduce the waste of the computing resource, and improve the utilization rate of the computing service resource of the cloud gaming server.

In an embodiment, as shown in FIG. 5, a method for processing cloud gaming resource data is provided, and the method includes the following steps.

Step S502: Release a computing service resource and adjust a current running state to an idle state in a case that a current game process satisfies a cutscene insertion condition.

For example, when the cloud gaming server detects that the current game process satisfies the cutscene insertion condition, that is to say, the current game process enters a cutscene stage, the cloud gaming server may suspend the rendering and coding operation of the cloud gaming resource, and transfer the operation of transmitting the cutscene data to the resource distribution server during the cutscene stage.

Further, when the cloud gaming server suspends the rendering and coding operation of the cloud gaming resource, the currently occupied computing service resource may be released, and the current running state of the cloud gaming server may be adjusted to an idle state. The cloud gaming server in the idle state may accept resource data processing request from another terminal device, and invoke the computing service resource that is released to process another resource data processing request.

Step S504: Obtain a required resource consumption carried in a resource data processing request transmitted by another terminal device in a case that the resource data processing request is detected in the idle state.

For example, when the cloud gaming server detects the resource data processing request transmitted by another terminal devices in the idle state, the received resource data processing request is obtained and parsed to extract the required resource consumption carried in the resource data processing request.

The required resource consumption carried by the resource data processing request is used for representing a number of resources required to run the game instance and perform the resource data processing. That is to say, when the cloud gaming server detects the resource data processing request transmitted by another terminal device in the idle state, it is necessary to determine whether there is enough resource to run the requested game instance currently. The computing service resource may be invoked to perform the resource data processing on the game instance only when it is determined that there is enough resource to run the requested game instance and perform the resource data processing on the game instance currently.

Step S506: Invoke, in response to the resource data processing request in a case that it is determined that the required resource consumption is satisfied, the computing service resource to perform a data processing operation corresponding to the resource data processing request.

For example, when the cloud gaming server determines that there is enough resource to run the requested game instance and perform the resource data processing on the game instance currently, that is to say, when it is determined that the resource consumption required satisfy the resource data processing request, the resource data processing request is further responded to, and the required computing service resource is invoked, and the data processing operation corresponding to the resource data processing request is executed to avoid waste of resource, so as to realize effective use of the resource.

In an embodiment, as shown in FIG. 6, a schematic diagram of service resource invocation when calculating the required resource consumption of a cloud gaming server is provided. It may be understood from FIG. 6 that the cloud gaming server may serve a plurality of game users. For example, for the game user 1, when the current game process of the terminal device where the game user 1 is located enters the cutscene stage, the operation is suspended and the computing service resource is released. When it is determined that the cutscene data of the terminal device where the game user 1 is located is played, the rendering, coding, and output operation of the cloud gaming resources for the game user 1 are resumed.

For a game user 2, when the current game process of the terminal device where the game user 2 is located is the game operating stage, the cloud gaming resource data corresponding to the game image that needs to be displayed on the terminal device where the game user 2 is located is rendered, coded, and outputted.

Similarly, for a game user 3, the cloud gaming server can detect the resource data processing request transmitted by the terminal device where game user 3 is located in the idle state, determines whether there is enough resource to run the requested game instance currently, and performs resource data processing on the game instance. When the resource consumption required to satisfy the resource data processing request is determined, the data processing operation corresponding to the resource data processing request is performed by responding the resource data processing request and invoking the corresponding computing service resource.

In the method for processing cloud gaming resource data, when the current game process satisfies the cutscene insertion condition, the computing service resource is released, and the current running state is adjusted to the idle state. When the resource data processing request transmitted by another terminal device is detected in the idle state and the resource consumption required to satisfy the resource data processing request is determined, the computing service resource is invoked to perform a data processing operation corresponding to the resource data processing request in response to the resource data processing request. The effective utilization of the cloud server resource is realized, the repeated rendering and coding operation of the cutscene data to occupy the cloud server resource is avoided, and the resource waste is reduced.

In an embodiment, before the transmitting the resource distribution instruction and the cutscene data identifier to a resource distribution server, the method further includes obtaining a rendering instruction corresponding to the cutscene data identifier, and rendering, based on the rendering instruction, to-be-outputted image data of the current game process to generate a rendered to-be-outputted image; and performing coding based on the rendered to-be-outputted image, to generate a corresponding video cutscene, and associatively storing the video cutscene and the game instance in the resource distribution server.

The cutscene data includes a video cutscene. It may be understood that many games set a story background introduction at the beginning of the game, which can be configured as one of the video cutscenes. The content is fixed and unchanged for all game users, no matter when the game user turns on the game. Further, the fixed content that needs to be played can be understood as the playback of a piece of video content. In the game, a fixed command string can be used for rendering the image to obtain the video content and play the picture, or the video content built into the game is directly played to realize the playback of the video cutscene.

For example, for a manner requiring rendering in advance, a manner of playing the game once in advance, obtaining the output image of the game, and rendering and coding the output image of the game into a video file may be used. The video file is deployed to the resource distribution server, and the current game process displayed by the terminal device of the game user enters the cutscene stage to start playing.

Further, for a manner requiring rendering in advance, a rendering instruction corresponding to the cutscene data identifier is obtained by playing the game once in advance. The to-be-outputted image data of the current game process is rendered to generate a rendered to-be-outputted image based on the rendering instruction. The coding based on the rendered to-be-outputted image is performed to generate a corresponding video cutscene, and the video cutscene and the game instance are associatively stored in the resource distribution server. As a result, playback may begin when the current game process displayed on the terminal device of the game user enters the cutscene stage.

In an embodiment, before the transmitting the resource distribution instruction and the cutscene data identifier to a resource distribution server, the method further includes obtaining a video cutscene corresponding to the cutscene data identifier, and associatively storing the video cutscene and the game instance in the resource distribution server.

For the video cutscene, a manner of directly copying the video cutscene in the game and deploying the video cutscene to the resource distribution server may further be used, to start playing the video cutscene when the current game process displayed by the terminal device of the game user enters the cutscene stage.

For example, a manner of directly obtaining the video cutscene corresponding to the cutscene data identifier from the game instance may be used. The video cutscene and the game instances are associatively stored in the resource distribution server, so that the video cutscene may be played when the current game process displayed on the terminal device of the game user enters the cutscene stage.

Figures 7, 8:
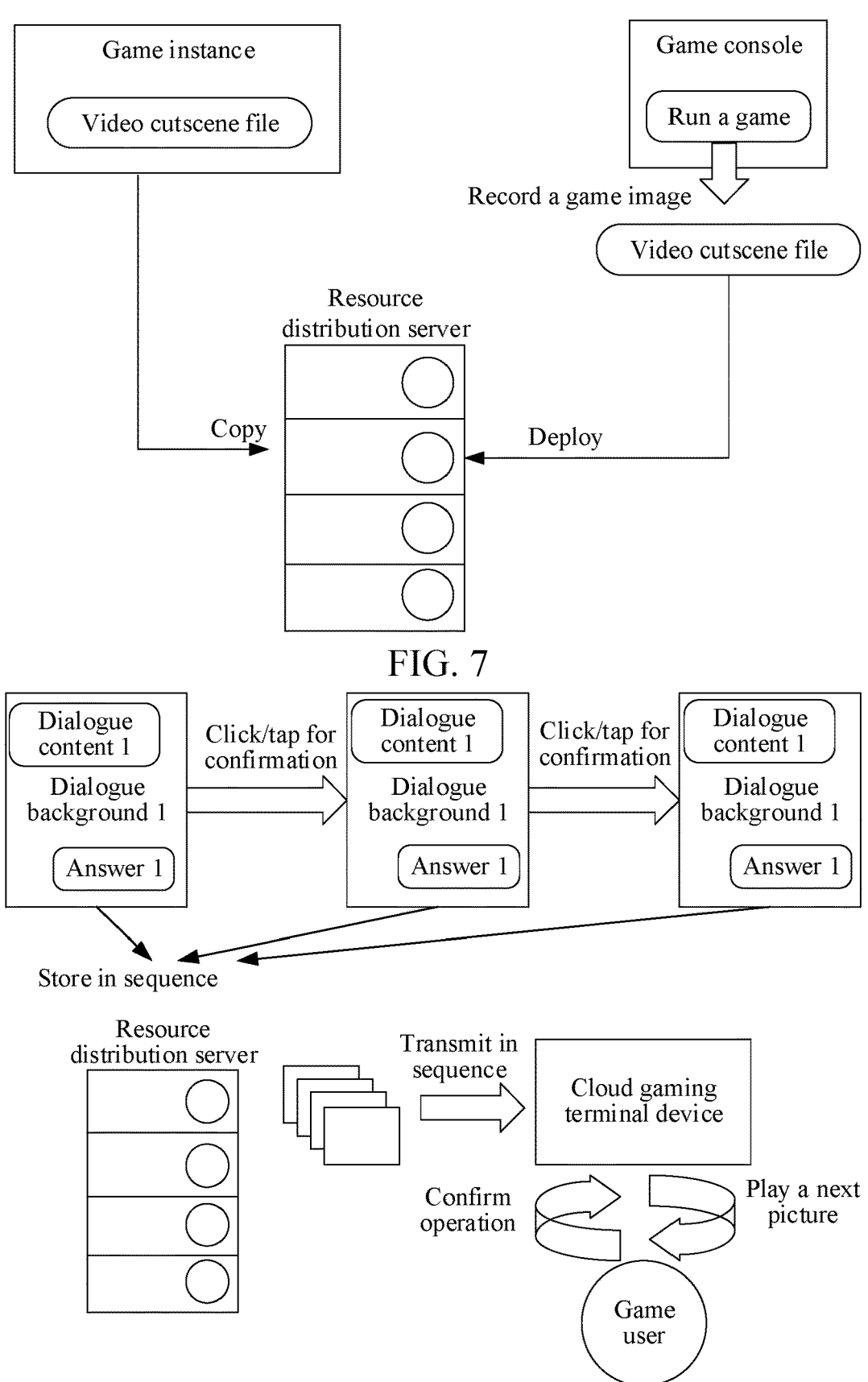
FIG. 7 is a schematic diagram of deployment of a video cutscene according to an embodiment.
FIG. 8 is a schematic diagram of deployment of a dialogue cutscene according to an embodiment.

In an embodiment, as shown in FIG. 7, a schematic diagram of deployment of a video cutscene is provided. It may be understood from FIG. 7 that one manner is of copying a video cutscene file corresponding to the game instance, and deploying the video cutscene file on the resource distribution server. Another manner is of running the game in advance on a game console and recording the game image to obtain the video cutscene file, to deploy the video cutscene file on the resource distribution server.

Different deployment manners are used for realizing deployment of the video cutscene file on the resource distribution server, to start playing the video cutscene when the current game process displayed by the terminal device of the game user enters the cutscene stage.

In this embodiment, the rendered to-be-outputted image is generated by obtaining a rendering instruction corresponding to the cutscene data identifier and the to-be-outputted image data of the current game process is rendered to generate a rendered to-be-outputted image based on the rendering instruction. The coding based on the rendered to-be-outputted image is performed to generate a corresponding video cutscene, and the video cutscene and the game instance are associatively stored in the resource distribution server. The advance rendering, coding, and associatively storage of the video cutscene are realized, without requiring the rendering and coding process for real-time video cutscene during the game. The processing time of the video cutscene is reduced, and when playback is required, the cutscene can be directly requested and played from the resource distribution server, which improves processing efficiency of the resource data in the game process.

In an embodiment, before the transmitting the resource distribution instruction and the cutscene data identifier to a resource distribution server, the method further includes obtaining dialogue cutscene data corresponding to the cutscene data identifier, the dialogue cutscene data including each to-be-played picture, and a playback time number corresponding to the each to-be-played picture; and associatively storing each to-be-played picture and a corresponding game instance in the resource distribution server successively based on the playback time number.

The cutscene data includes the dialogue cutscene, and the dialogue cutscene is closer to browsing of the picture. As in a normal manual slide projection, the user clicks to confirm, and then a next picture is played based on the play order. It may be understood that the dialogue cutscene is not continuously played video, but is composed of pictures, and a switching time of each picture is not fixed, which is triggered by the user.

In an example, the each to-be-played picture and the corresponding game instance may be associatively stored in the resource distribution server based on the playback time number by obtaining the dialogue cutscene data including each to-be-played picture and a playback time number corresponding to the each to-be-played picture.

Further, a transmission manner of the to-be-played picture is one-time transmission or batch transmission. When the current game process of the game user enters the cutscene stage, each to-be-played picture included in the corresponding dialogue cutscene data is transmitted to the terminal device at one time or in batches. When it is detected that the game user is configured to confirm the operation of clicking on the terminal device, the next picture is played sequentially based on the playback time number of the each to-be-played picture.

In an embodiment, as shown in FIG. 8, a schematic diagram of deployment of a dialogue cutscene is provided. It may be understood from FIG. 8 that the to-be-played picture and the corresponding playback time number included in the cutscene are obtained, and the to-be-played picture is sequentially stored in the resource distribution server based on the playback time number.

The to-be-played picture includes a dialogue background and dialogue content. the dialogue content includes question content and answer content corresponding to different roles in the game instance and a current role of the game user respectively.

Further, when it is detected that the cutscene stage is entered, the resource distribution server transmits the corresponding dialogue cutscene data to each to-be-played picture to the terminal device at one time or in batches. When it is detected that the game user is configured to confirm the operation of clicking, the next picture is played sequentially based on the playback time number of the each to-be-played picture.

In this embodiment, the each to-be-played picture and the corresponding game instance may be associatively stored in the resource distribution server based on the playback time number by obtaining the dialogue cutscene data corresponding to the cutscene data identifier, including each to-be-played picture and the playback time number corresponding to the each to-be-played picture. The advance rendering, coding, and associatively storage of the dialogue cutscene are realized, without requiring the rendering and coding process for real-time dialogue cutscene during the game. The processing time of the dialogue cutscene is reduced, and when playback is required, the cutscene can be directly requested and played from the resource distribution server, which improves processing efficiency of the resource data in the game process.

In an embodiment, as shown in FIG. 9, a method for processing cloud gaming resource data is provided. This embodiment mainly describes with an example in which the method is applied to the resource distribution server in FIG. 1, and the method includes the following steps:

Step S902: Receive a resource distribution instruction and a cutscene data identifier transmitted by a cloud gaming server, the resource distribution instruction being generated in a case that the cloud gaming server detects that a current game process satisfies a cutscene insertion condition. In an example, cutscene identification information of the cutscene that is to be displayed in an instance of a cloud game is received from a cloud gaming server. The cutscene identification information indicates the cutscene to be displayed and the cloud gaming server is configured to render content of the instance of the cloud game.

For example, when the resource distribution server receives the resource distribution instruction transmitted by the cloud gaming server, the cutscene data identifier carried by the resource distribution instruction is obtained. The cutscene data identifier is used for obtaining the cutscene data corresponding to the current cutscene stage through matching from the pre-stored static resource library. The pre-stored static resource library may include a database or other data formats stored in a memory, for example.

The resource distribution instruction is generated in a case that the cloud gaming server detects that a current game process satisfies a cutscene insertion condition, while the cutscene data identifier corresponds to the cutscene data to be inserted or played. The cutscene data may be cutscenes corresponding to a current game instance to which the current game process belongs, or may be advertising data to be served, which may be flexibly set according to a requirement of an actual application process, and is not limited to a specific type of data.

That the cutscene insertion condition is satisfied includes at least one of: the current game process enters a cutscene stage, a cutscene playback button is triggered by a game user, and an animation insertion logic built in a program that is currently normally running is detected.

Step S904: Obtain, in response to the resource distribution instruction, cutscene data corresponding to a current cutscene stage from a pre-stored static resource library through matching based on the cutscene data identifier. In an example, cutscene data corresponding to the cutscene is obtained based on the cutscene identification information.

For example, when receiving the resource distribution instruction transmitted by the cloud gaming server and the corresponding cutscene data identifier, the resource distribution server obtains the cutscene data corresponding to the cutscene data identifier through matching from the pre-stored static resource library based on the cutscene data identifier.

The resource distribution server and the cloud gaming server are connected to the terminal device. The cloud gaming server is configured to feed back a game operating stage to the terminal device and render the coded game image based on the cloud game resource. The resource distribution server pre-stores a static resource library. The pre-stored static resource block stores cutscene data for a plurality of types of cloud gaming. The resource distribution server may determine the matching cutscene data from the pre-stored static resource library based on the cutscene data identifier, and transmit the cutscene data to the terminal device for display.

Step S906: Transmit the cutscene data to a terminal device for display, the cloud gaming server being configured to render the cloud gaming resource data of the current game process and output the data to the terminal device for display in a case that playback of the cutscene data on the terminal device ends. In an example, the cutscene data is sent to a terminal device for display. The cloud gaming server is configured to render of the content of the instance of the cloud game to be displayed after the cutscene on the terminal device.

For example, after the resource distribution server obtains the cutscene data corresponding to the current cutscene stage through matching from the pre-stored static resource library, the cutscene data is transmitted to the terminal device for display, so as to achieve seamless switching between the cutscene and the game image, and avoid a problem that game user needs to wait for a blank page or a buffer page.

Further, in a case that playback of the cutscene data on the terminal device ends, that is, the current game process has ended the cutscene stage, the game operating stage is entered. The cloud gaming server needs to recover rendering and coding operations for the cloud gaming resource data of the current game process during a game operating stage, and transmit game image data obtained through the rendering and coding to the terminal device for the game user to view.

In an embodiment, in a case that playback of the cutscene data on the terminal device ends, the resource distribution server triggers the running recovery instruction, and transmits the running recovery instruction to the cloud gaming server. Further, the cloud gaming server responds to the running recovery instruction, resumes a rendering and coding operation of cloud gaming resource data of the current game process during a game operating stage, and transmits game image data to the terminal device for the game user to view based on the game image data obtained by a rendering and coding process.

In the above method for processing cloud gaming resource data, the cutscene data corresponding to a current cutscene stage is obtained from a pre-stored static resource library through matching based on the cutscene data identifier by receiving the resource distribution instruction and the cutscene data identifier transmitted by the cloud gaming server and in response to the resource distribution instruction, to transmit the cutscene data to the terminal device for display. The cloud gaming server may be configured to render the cloud gaming resource data of the current game process and outputting the data to the terminal device for display in a case that playback of the cutscene data on the terminal device ends. The cutscene data to be played is directly transmitted through the resource distribution server, and the computing service resource occupation of the cloud gaming server can be reduced, so as to realize a separate processing of the cutscene data and the cloud gaming resource data, avoid repeated cutscene data occupying a large amount of service computing resources, and reduce the waste of the computing resource.

Figure 10:
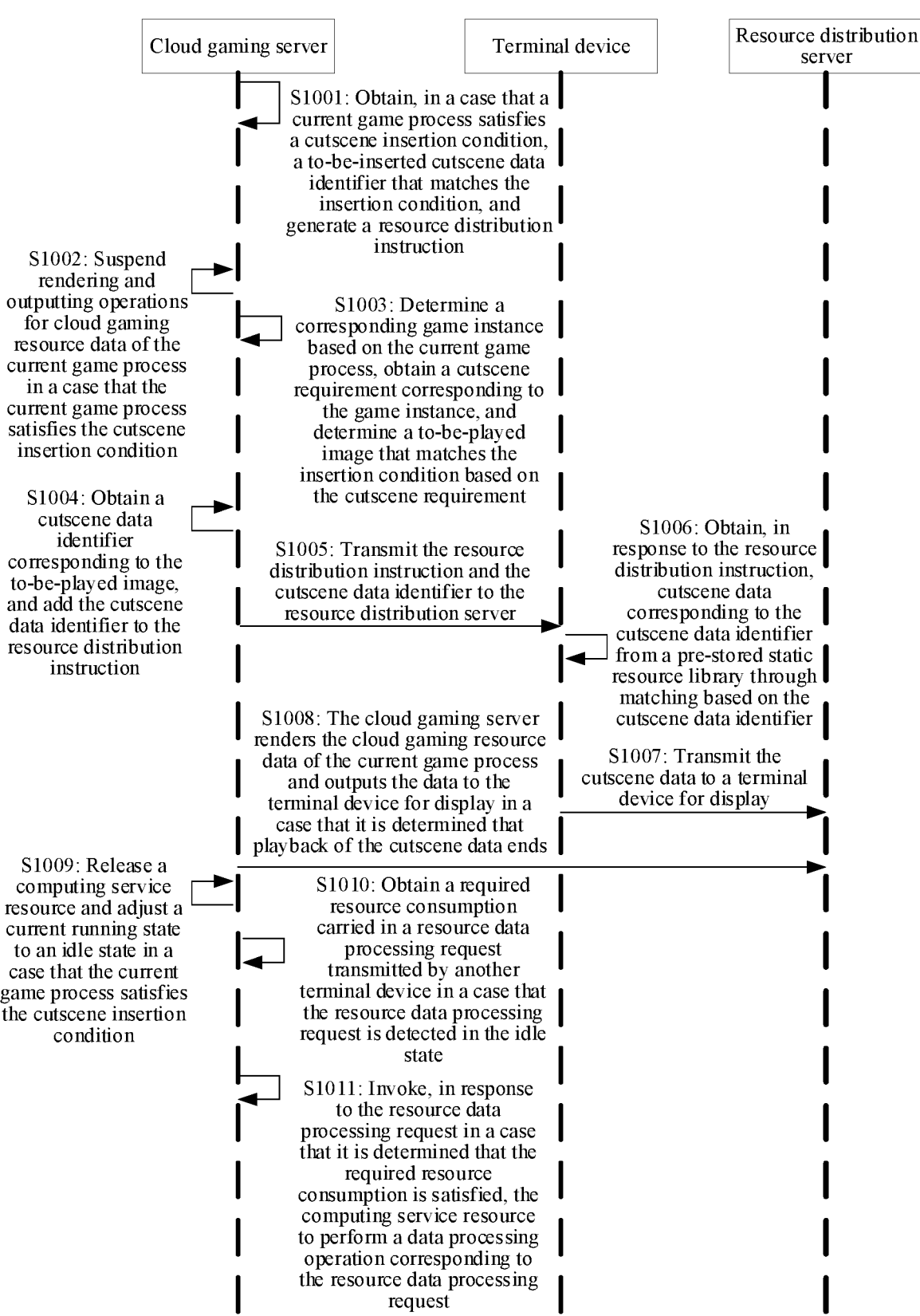
FIG. 10 is a timing schematic diagram of a method for processing cloud gaming resource data according to an embodiment.

In an embodiment, as shown in FIG. 10, a method for processing cloud gaming resource data is provided. It may be understood from FIG. 10 that the method for processing cloud gaming resource data specifically includes the following steps.

Step S1001: Obtain, in a case that a cloud gaming server determines that a current game process satisfies a cutscene insertion condition, a to-be-inserted cutscene data identifier that matches the insertion condition, and generate a resource distribution instruction.

Step S1002: The cloud gaming server suspends the rendering and outputting operations for the cloud gaming resource data of the current game process in a case that the current game process satisfies the cutscene insertion condition.

Step S1003: The cloud gaming server determines a corresponding game instance based on the current game process, obtains a cutscene requirement corresponding to the game instance, and determines a to-be-played image that matches the insertion condition based on the cutscene requirement.

Step S1004: The cloud gaming server obtains a cutscene data identifier corresponding to the to-be-played image, and adds the cutscene data identifier to the resource distribution instruction.

Step S1005: The cloud gaming server transmits the resource distribution instruction and the cutscene data identifier to a resource distribution server.

Step S1006: Obtain, in response to the resource distribution instruction by the resource distribution server, cutscene data corresponding to the cutscene data identifier from a pre-stored static resource library through matching based on the cutscene data identifier.

Step S1007: The resource distribution server transmits the cutscene data to the terminal device for display.

Step S1008: The cloud gaming server renders cloud gaming resource data of the current game process and outputs the data to the terminal device for display in a case that it is determined that playback of the cutscene data ends.

After step S1002 is performed, step S1009 of the cloud gaming server releases a computing service resource and adjusts a current running state to an idle state in a case that the current game process satisfies the cutscene insertion condition is performed.

Step S1010: The cloud gaming server obtains a required resource consumption carried in a resource data processing request transmitted by another terminal device in a case that the resource data processing request is detected in the idle state.

Step S1011: The cloud gaming server invokes, in response to the resource data processing request in a case that it is determined that the required resource consumption is satisfied, the computing service resource to perform a data processing operation corresponding to the resource data processing request.

Figure 11:
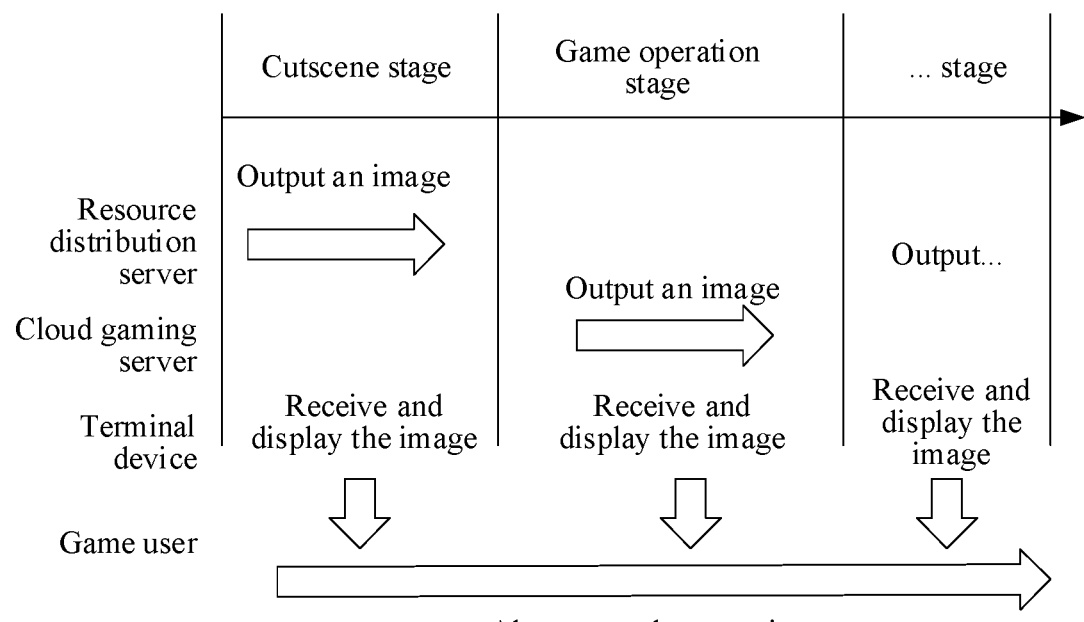
FIG. 11 is a schematic diagram of switching and displaying a cloud gaming resource according to an embodiment.

In an embodiment, as shown in FIG. 11, a schematic diagram of switching and displaying a cloud gaming resource is provided. It may be understood from FIG. 11 that based on a game progress timeline of the game instance, in the cutscene stage, the resource server transmits the output image corresponding to the cutscene to the terminal device, and the terminal device displays the received output image for the user to view. At the same time, the cloud gaming server suspends the rendering and coding operation of the cloud gaming resource data of the game process in the cutscene stage.

During the game operating stage, the cloud gaming resource data of the game process is rendered and coded by the cloud gaming server, and the game image produced is outputted to the terminal device, and the terminal device displays the received game image for the user to view.

Similarly, as a follow-up to enter the cutscene stage or the game operating stage, the resource data is still processed and transmitted by the corresponding resource distribution server or cloud gaming server.

Figure 12:
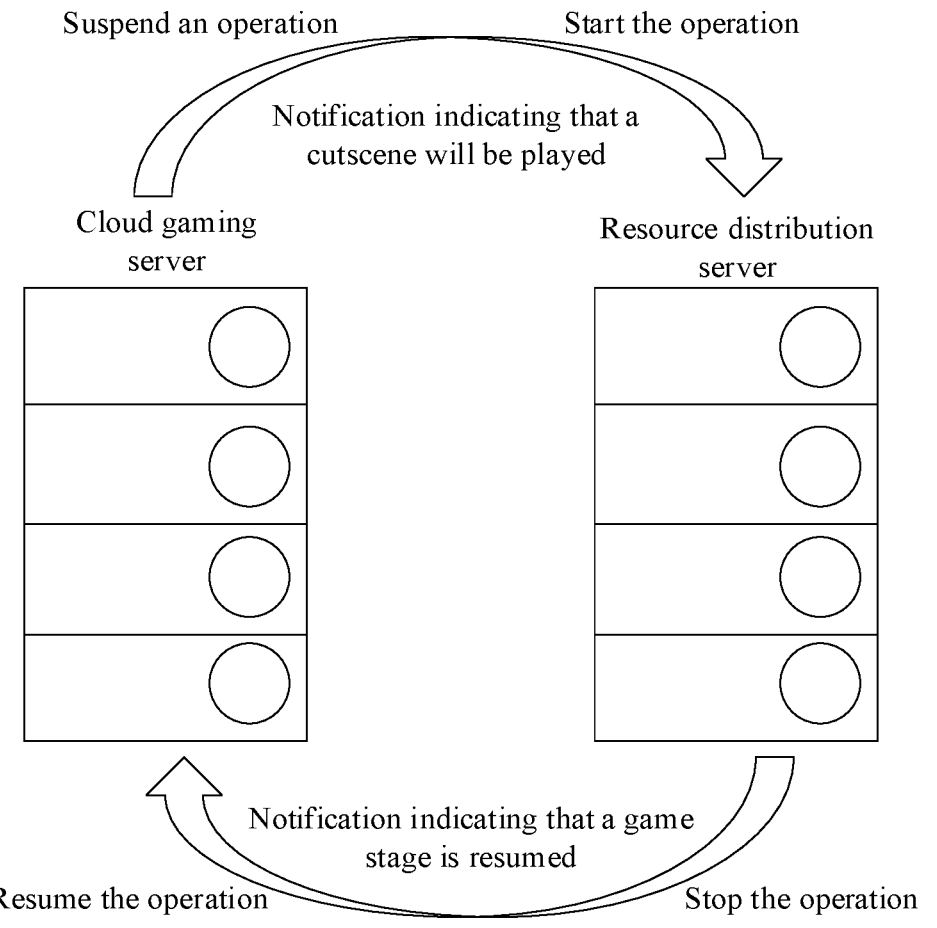
FIG. 12 is a schematic diagram of operation switching between a cloud gaming server and a resource distribution server according to an embodiment.

In an embodiment, as shown in FIG. 12, a schematic diagram of an operation switching between a cloud gaming server and a resource distribution server is provided. It may be understood from FIG. 12 that when it is determined that the current game process enters the cutscene stage, the cloud gaming server suspends an operation and notifies the resource distribution server to start running. That is to say, in the cutscene stage, the cloud gaming server suspends the rendering and coding operation of the cloud gaming resource data of the game process. The resource server determines the matching cutscene based on the cutscene data identifier, and transmits the output image corresponding to the cutscene to the terminal device.

Further, when it is determined that the process animation playback of the terminal device ends, the game operating stage is entered, the resource server suspends the operation, the cloud gaming resource data of the game process is rendered and coded by the cloud gaming server, and the game image produced is outputted to the terminal device.

Figure 13:
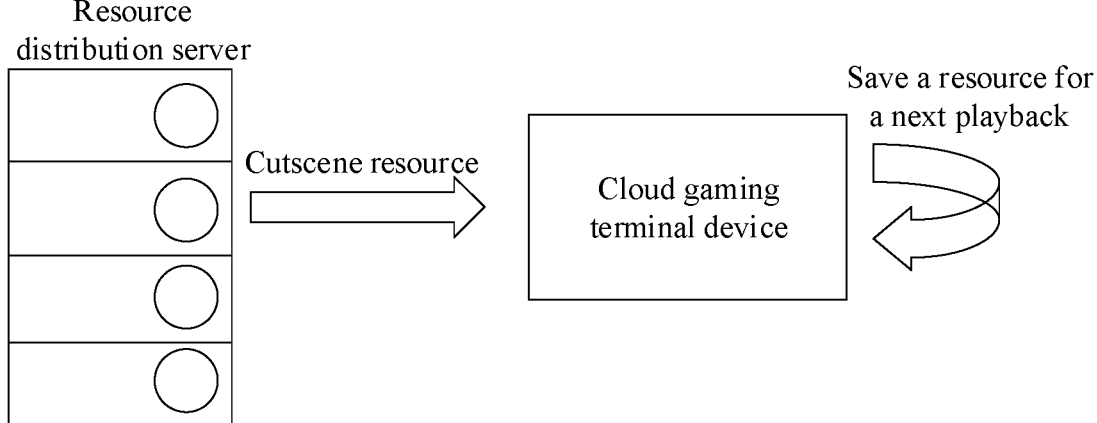
FIG. 13 is a schematic diagram of a cutscene resource storage according to an embodiment.

In an embodiment, as shown in FIG. 13, a schematic diagram of a cutscene resource storage is provided. It may be understood from FIG. 13 that the fixed video clip or picture resource in the game can be directly stored in the terminal device of the cloud gaming after a first playback. Further, the next time the cutscene is entered, read and play may be directly performed from the terminal device of the cloud gaming, without requesting the resource distribution server.

For example, the above may be understood as follows: after the terminal device in the game instance plays a cutscene, the next time the cutscene is played again with the same terminal device, it is directly obtained from the local data stored by the terminal device and played.

In the above method for processing cloud gaming resource data, when the current game process satisfies the cutscene insertion condition, a to-be-inserted cutscene data identifier that matches an insertion condition is obtained and a resource distribution instruction is generated, and the resource distribution instruction and the cutscene data identifier are transmitted to the resource distribution server, the resource distribution instruction indicating that the resource distribution server needs to obtain cutscene data corresponding to the cutscene data identifier from a pre-stored static resource library through matching and transmit the cutscene data to a terminal device for display; and rendering cloud gaming resource data of the current game process and outputting the data to the terminal device for display in a case that it is determined that playback of the cutscene data ends. Since the cloud gaming server is not required to render and code the cutscene data in real time, and the cutscene data to be played is directly transmitted through the resource distribution server, the computing service resource occupation of the cloud gaming server can be reduced. Further, a separate processing of the cutscene data and the cloud gaming resource data is realized, so as to avoid repeated cutscene data occupying a large amount of service computing resources, reduce the waste of the computing resource, and improve the utilization rate of the computing service resource of the cloud gaming server.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this disclosure, execution of the steps is not strictly limited, and the steps may be performed in other sequences. Moreover, at least some of the steps in each embodiment may include a plurality of steps or a plurality of stages. The steps or stages are not necessarily performed at the same moment but may be performed at different moments. Execution of the steps or stages is not necessarily sequentially performed, but may be performed alternately with other steps or at least some of steps or stages of other steps.

Embodiments of this disclosure further provide an apparatus for processing cloud gaming resource data configured to realize the method for processing cloud gaming resource data. The implementation provided by the apparatus to solve the problem can be similar to the implementation described in the above methods. Therefore, for examples of the embodiments of one or more apparatuses for processing cloud gaming resource data provided below, reference can be made to the examples described for the methods for processing cloud gaming resource data above.

Figure 14:
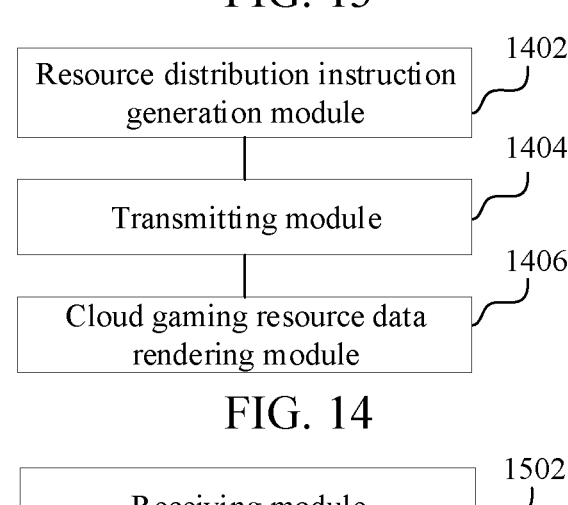
FIG. 14 is a structural block diagram of an apparatus for processing cloud gaming resource data according to an embodiment.

In an embodiment, as shown in FIG. 14, an apparatus for processing cloud gaming resource data is provided, including a resource distribution instruction generation module 1402, a transmitting module 1404, and a cloud gaming resource data rendering module 1406.

The resource distribution instruction generation module 1402 is configured to obtain, in a case that a current game process satisfies a cutscene insertion condition, a to-be-inserted cutscene data identifier that matches the insertion condition, and generate a resource distribution instruction.

The transmitting module 1404 is configured to configured to transmit the resource distribution instruction and the cutscene data identifier to a resource distribution server, the resource distribution instruction indicating that the resource distribution server needs to obtain cutscene data corresponding to the cutscene data identifier from a pre-stored static resource library through matching and transmit the cutscene data to a terminal device for display.

The cloud gaming resource data rendering module 1406 is configured to render cloud gaming resource data of the current game process and output the data to the terminal device for display in a case that it is determined that playback of the cutscene data ends.

In the above apparatus for processing cloud gaming resource data, when the current game process satisfies the cutscene insertion condition, a to-be-inserted cutscene data identifier that matches an insertion condition is obtained and a resource distribution instruction is generated, and the resource distribution instruction and the cutscene data identifier are transmitted to the resource distribution server, the resource distribution instruction indicating that the resource distribution server needs to obtain cutscene data corresponding to the cutscene data identifier from a pre-stored static resource library through matching and transmit the cutscene data to a terminal device for display; and rendering cloud gaming resource data of the current game process and outputting the data to the terminal device for display in a case that it is determined that playback of the cutscene data ends. Since the cloud gaming server is not required to render and code the cutscene data in real time, and the cutscene data to be played is directly transmitted through the resource distribution server, the computing service resource occupation of the cloud gaming server can be reduced. Further, a separate processing of the cutscene data and the cloud gaming resource data is realized, so as to avoid repeated cutscene data occupying a large amount of service computing resources, reduce the waste of the computing resource, and improve the utilization rate of the computing service resource of the cloud gaming server.

In an embodiment, an apparatus for processing cloud gaming resource data is provided. The apparatus further includes a computing service resource release module, a resource data processing request detection module, and a data processing operation execution module.

The computing service resource release module is configured to release a computing service resource, and adjust a current running state to an idle state.

The resource data processing request detection module is configured to obtain a required resource consumption carried in a resource data processing request transmitted by another terminal device in a case that the resource data processing request is detected in the idle state.

The data processing operation execution module is configured to invoke, in response to the resource data processing request in a case that it is determined that the required resource consumption is satisfied, the computing service resource to perform a data processing operation corresponding to the resource data processing request.

In an embodiment, an apparatus for processing cloud gaming resource data is provided. The apparatus further includes a cutscene obtaining module, a to-be-played image determination module, and a cutscene data identifier obtaining module.

The cutscene obtaining module is configured to determine a corresponding game instance based on the current game process, and obtain a cutscene requirement corresponding to the game instance.

The to-be-played image determination module is configured to determine a to-be-played image that matches the insertion condition based on the cutscene requirement.

The cutscene data identifier obtaining module is configured to obtain a cutscene data identifier corresponding to the to-be-played image, and add the cutscene data identifier to the resource distribution instruction.

In an embodiment, an apparatus for processing cloud gaming resource data is provided. A video cutscene storage module is further included, which is configured to obtain a rendering instruction corresponding to the cutscene data identifier, and render, based on the rendering instruction, to-be-outputted image data of the current game process to generate a rendered to-be-outputted image; and perform coding based on the rendered to-be-outputted image, to generate a corresponding video cutscene, and associatively store the video cutscene and the game instance in the resource distribution server.

In an embodiment, the video cutscene storage module is further configured to obtain a video cutscene corresponding to the cutscene data identifier, and associatively store the video cutscene and the game instance in the resource distribution server. In an embodiment, an apparatus for processing cloud gaming resource data is provided. A dialogue cutscene data storage module is further included, which is configured to obtain dialogue cutscene data corresponding to the cutscene data identifier, the dialogue cutscene data including each to-be-played picture, and a playback time number corresponding to the each to-be-played picture; and associatively store each to-be-played picture and a corresponding game instance in the resource distribution server successively based on the playback time number.

In an embodiment, an apparatus for processing cloud gaming resource data is provided. A suspending module is further included, which is configured to suspend rendering and outputting operations for the cloud gaming resource data of the current game process in a case that the current game process satisfies the cutscene insertion condition.

In an embodiment, an apparatus for processing cloud gaming resource data is provided. The apparatus further includes a running recovery instruction receiving module, a running recovery module, and a game image data obtaining module.

The running recovery instruction receiving module is configured to receive a running recovery instruction transmitted by the resource distribution server in a case that it is determined that playback of the cutscene data ends.

The running recovery module is configured to recover rendering and coding operations for the cloud gaming resource data of the current game process during a game operating stage in response to the running recovery instruction.

The game image data obtaining module is configured to obtain game image data based on the rendering and coding operations, and transmit the game image data to the terminal device for display.

Figure 15:
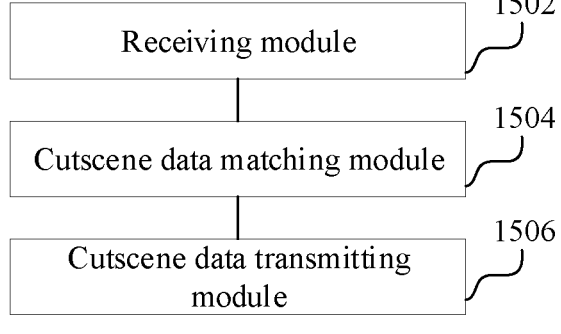
FIG. 15 is a structural block diagram of an apparatus for processing cloud gaming resource data according to another embodiment.

In an embodiment, as shown in FIG. 15, an apparatus for processing cloud gaming resource data is provided, including a receiving module 1502, a cutscene data matching module 1504, and a cutscene data transmitting module 1506.

The receiving module 1502 is configured to receive a resource distribution instruction and a cutscene data identifier transmitted by a cloud gaming server, the resource distribution instruction being generated in a case that the cloud gaming server detects that a current game process satisfies a cutscene insertion condition.

The cutscene data matching module 1504 is configured to obtain, in response to the resource distribution instruction, cutscene data corresponding to a current cutscene stage from a pre-stored static resource library through matching based on the cutscene data identifier.

The cutscene data transmitting module 1506 is configured to transmit the cutscene data to a terminal device for display, the cloud gaming server being configured to render the cloud gaming resource data of the current game process and output the data to the terminal device for display in a case that playback of the cutscene data on the terminal device ends.

In the above apparatus for processing cloud gaming resource data, the cutscene data corresponding to a current cutscene stage is obtained from a pre-stored static resource library through matching based on the cutscene data identifier by receiving the resource distribution instruction and the cutscene data identifier transmitted by the cloud gaming server and in response to the resource distribution instruction, to transmit the cutscene data to the terminal device for display. The cloud gaming server may be configured to render the cloud gaming resource data of the current game process and outputting the data to the terminal device for display in a case that playback of the cutscene data on the terminal device ends. The cutscene data to be played is directly transmitted through the resource distribution server, and the computing service resource occupation of the cloud gaming server can be reduced, so as to realize a separate processing of the cutscene data and the cloud gaming resource data, avoid repeated cutscene data occupying a large amount of service computing resources, and reduce the waste of the computing resource.

In an embodiment, an apparatus for processing cloud gaming resource data is provided. A running recovery instruction generation module is further included, which is configured to trigger a running recovery instruction and transmit the running recovery instruction to the cloud gaming server in a case that it is determined that playback of the cutscene data on the terminal device ends, the running recovery instruction indicating the cloud gaming server needs to recover rendering and coding operations for the cloud gaming resource data of the current game process during a game operating stage, and transmit game image data obtained through the rendering and coding to the terminal device for display.

In an embodiment, an apparatus for processing cloud gaming resource data is provided. The cutscene data includes a dialogue cutscene, the dialogue cutscene including a plurality of to-be-played pictures and a playback time number corresponding to each of the to-be-played pictures. The apparatus further includes a to-be-played picture transmitting module and a playback module.

The to-be-played picture transmitting module is configured to transmit each to-be-played picture to the terminal device in a case that the current game process enters a cutscene stage.

The playback module is configured to successively play a next picture based on the playback time number of each to-be-played picture in a case that a confirmation operation triggered based on the terminal device is detected.

All or some of modules in the apparatus for processing cloud gaming resource data may be implemented by software, a hardware, or a combination thereof. The foregoing modules may be built in or independent of a processor of a computer device in a form of hardware, or may be stored in a memory of the computer device in a form of software, so that the processor invokes and performs an operation corresponding to each of the foregoing modules.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

In an embodiment, a computer device is provided. The computer device may be a server. An internal structure diagram of the server may be shown in FIG. 16. The computer device includes a processor, a memory, an input/output (I/O for short) interface, and a communication interface. The processor, the memory, and the I/O interface are connected through a system bus, and the communication interface is connected to the system bus through the I/O interface. The processor of the computer device is configured to provide computing and control capabilities. The memory of the computer device includes a non-volatile storage medium and an internal memory. The non-volatile storage medium stores a running system, computer-readable instructions, and a database. The internal memory provides an environment for execution of the running system and the computer-readable instructions in the non-volatile storage medium. The database of the computer device is configured to store cutscene data identifier, resource distribution instructions, pre-stored static resource library, cutscene data, cloud gaming resource data, and the like. The I/O interface of the computer device is configured to exchange information between the processor and the external device. The communication interface of the computer device is configured to connect and communicate with an external terminal through a network. The computer-readable instructions are executed to implement a method for processing cloud gaming resource data.

Figure 16:
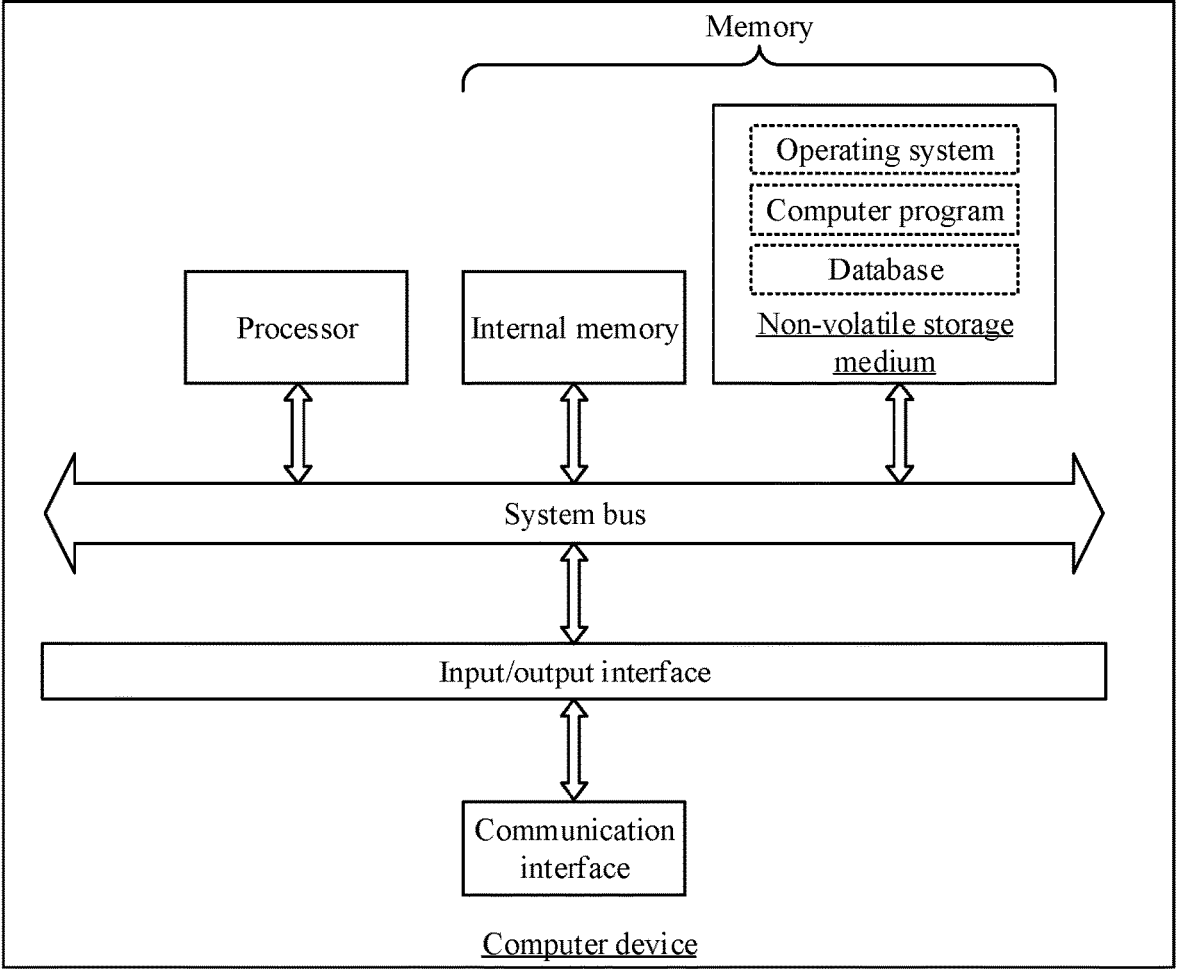
FIG. 16 is a diagram of an internal structure of a computer device according to an embodiment.

It is to be understood by a person skilled in the art that the structure shown in FIG. 16 is only a block diagram of a part of the structure related to the solution of this disclosure, and does not constitute a limitation on the computer device to which the solution of this disclosure is applied. The computer device may include more or fewer components than components shown in the figure, or be combined with some components, or have a different component arrangement.

In an embodiment, a computer device is further provided, including a memory and a processor. The memory stores computer-readable instructions. The processor implements the operations in the foregoing method embodiments when executing the computer-readable instructions.

In an embodiment, a computer-readable storage medium is provided, storing computer-readable instructions. The computer-readable storage medium includes a non-transitory computer-readable storage medium for example. The computer-readable instructions, when executed by a processor, implement the operations in the foregoing method embodiments.

In an embodiment, a computer program product is provided, including computer-readable instructions. The computer-readable instructions, when executed by the processor, the operations in the foregoing method embodiments are implemented.

A person of ordinary skill in the art may understand that all or some of procedures of the method in the foregoing embodiments may be implemented by computer-readable instructions instructing relevant hardware. The computer-readable instructions may be stored in a non-volatile computer-readable storage medium. When the computer-readable instructions are executed, the procedures of the foregoing method embodiments may be implemented. Any reference to a memory, a database, or another medium used in the embodiments provided in this disclosure may include at least one of a non-volatile memory and a volatile memory. The non-volatile memory may include a read-only memory (ROM) a magnetic tape, a floppy disk, a flash memory, an optical memory, a high density embedded non-volatile memory, a resistive memory (ReRAM), a magnetoresistive random access memory (MRAM), a magnetoresistive random access memory (FRAM), a phase change memory (PCM), a graphene memory, and the like. The non-volatile memory may include a random access memory (RAM) or an external cache memory. By way of description and not limitation, the RAM may be in various forms, such as a static random access memory (SRAM), a dynamic random access memory (DRAM), or the like. The databases involved in the embodiments provided in this disclosure may include at least one of a relational database and a non-relational database. The non-relational database may include a distributed database based on a block chain, and so on, which is not limited thereto. The processor involved in the embodiments provided in this disclosure may be any processing circuitry, such as a general purpose processor, a central processing unit, a graphics processing unit, a digital signal processor, a programmable logic device, a data processing logic device based on quantum computing, and the like, which is not limited thereto.

Technical features of the foregoing embodiments may be combined in various manners. To make the description more concise, not all possible combinations of the technical features in the foregoing embodiments are described. However, other combinations of these technical features shall be considered as falling within the scope of this disclosure.

The foregoing embodiments show only several exemplary implementations of this disclosure and are described in detail, which, however, are not to be construed as a limitation to the scope of this disclosure. It is to be noted that for a person of ordinary skill in the art, modifications and improvements can be made without departing from the scope of this disclosure. These modifications and improvements are within the scope of this disclosure.

What is claimed is:

1. A method for processing content of a cloud game, the method comprising:
    determining a cutscene is to be displayed in an instance of the cloud game;
    generating cutscene identification information based on the determination that the cutscene is to be displayed in the instance of the cloud game, the cutscene identification information indicating the cutscene to be displayed;
    sending the cutscene identification information of the cutscene to a cutscene server, the cutscene server being configured to send cutscene data of the cutscene to a terminal device for display based on the cutscene identification information;
    processing a resource request from another instance of the cloud game to allocate a computing resource of the instance of the cloud game to the other instance of the cloud game based on the determination that the cutscene is to be displayed;
    rendering the content of the instance of the cloud game to be displayed after the cutscene based on an end of the display of the cutscene; and
    outputting the rendered content to the terminal device for display after the display of the cutscene.

2. The method according to claim 1, further comprising:
    rendering the content of the instance of the cloud game to be displayed; and
    suspending the rendering of the content of the instance of the cloud game based on the determination that the cutscene is to be displayed in the instance of the cloud game,
    wherein the rendering the content of the instance of the cloud game to be displayed after the cutscene includes resuming the rendering of the content of the instance of the cloud game based on the end of the display of the cutscene.

3. The method according to claim 1, wherein the processing the resource request further comprises:
    based on the determination that the cutscene is to be displayed,
        releasing the computing resource allocated to the instance of the cloud game;

determining a required computing resource of the resource request of the other instance of the cloud game for another terminal device; and
allocating, in response to the resource request, the released computing resource to the other instance of the cloud game corresponding to the resource request.

4. The method according to claim 1, wherein the generating the cutscene identification information further comprises:
    determining a progress of the instance of the cloud game;
    determining a to-be-played image that is associated with the progress of the instance of the cloud game; and
    generating a cutscene data identifier corresponding to the to-be-played image, the cutscene data identifier being included in the cutscene identification information.

5. The method according to claim 1, further comprising:
    generating the cutscene data, and
    sending the cutscene data and the cutscene identification information to the cutscene server, the cutscene server being configured to store the cutscene data in association with the cutscene identification information.

6. The method according to claim 1, wherein the cutscene includes a dialogue cutscene, and the method further comprises:
    generating dialogue cutscene data corresponding to the cutscene identification information, the dialogue cutscene data including a plurality of pictures and playback information indicating an order in which the plurality of pictures is to be displayed; and
    sending the plurality of pictures, the playback information, and the cutscene identification information to the cutscene server, the cutscene server being configured to store the dialogue cutscene data and the playback information in association with the cutscene identification information.

7. The method according to claim 1, wherein the determining further comprises:
    determining the cutscene is to be displayed in the instance of the cloud game based on at least one of a progress of the instance of the cloud game entering a cutscene stage a cutscene playback button being triggered, or an insertion point being detected.

8. The method according to claim 1, further comprising:
    receiving resume information from the cutscene server, the resume information being sent by the cutscene server based on when the display of the cutscene ends,
    wherein the rendering the content includes rendering the content of the cloud game in response to the received resume information.

9. The method according to claim 6, wherein each of the plurality of pictures includes dialogue content, the dialogue content including question content and answer content corresponding to different roles in the cloud game.

10. The method according to claim 1, wherein the cutscene includes video content, the video content including an advertisement.

11. A method for processing a cutscene in a cloud game, the method comprising:
    receiving cutscene identification information of the cutscene that is to be displayed in an instance of the cloud game from a cloud gaming server, the cutscene identification information indicating the cutscene to be displayed and the cloud gaming server being configured to render content of the instance of the cloud game;

obtaining cutscene data corresponding to the cutscene based on the cutscene identification information; and sending the cutscene data to a terminal device for display, the cloud gaming server being configured to (i) process a resource request from another instance of the cloud game to allocate a computing resource of the instance of the cloud game to the other instance of the cloud game based on a determination that the cutscene is to be displayed, and (ii) render the content of the instance of the cloud game to be displayed after the cutscene on the terminal device.

12. The method according to claim 11, further comprising:

sending resume information to the cloud gaming server based on a progress of playback of the cutscene on the terminal device, the cloud gaming server being configured to resume the rendering of the content of the instance of the cloud game based on the resume information.

13. The method according to claim 11, wherein the cutscene data includes a dialogue cutscene, the dialogue cutscene including a plurality of pictures and playback information indicating an order in which the plurality of pictures is to be displayed, and the method further comprises:

sending the plurality of pictures to the terminal device based on the cutscene identification information, each of the plurality of pictures being displayed at the terminal device in response to a respective user input.

14. An apparatus for processing content of a cloud game, comprising:

processing circuitry configured to determine a cutscene is to be displayed in an instance of the cloud game;

generate cutscene identification information based on the determination that the cutscene is to be displayed in the instance of the cloud game, the cutscene identification information indicating the cutscene to be displayed;

send the cutscene identification information of the cutscene to a cutscene server, the cutscene server being configured to send cutscene data of the cutscene to a terminal device for display based on the cutscene identification information;

process a resource request from another instance of the cloud game to allocate a computing resource of the instance of the cloud game to the other instance of the cloud game based on the determination that the cutscene is to be displayed;

render the content of the instance of the cloud game to be displayed after the cutscene based on an end of the display of the cutscene; and output the rendered content to the terminal device for display after the display of the cutscene.

15. The apparatus according to claim 14, wherein the processing circuitry is configured to:

render the content of the instance of the cloud game to be displayed;

suspend the rendering of the content of the instance of the cloud game based on the determination that the cutscene is to be displayed in the instance of the cloud game; and resume the rendering of the content of the instance of the cloud game based on the end of the display of the cutscene.

16. The apparatus according to claim 14, wherein the processing circuitry is configured to:

based on the determination that the cutscene is to be displayed, release the computing resource allocated to the instance of the cloud game;

determine a required computing resource of the resource request of the other instance of the cloud game for another terminal device; and allocate, in response to the resource request, the released computing resource to the other instance of the cloud game corresponding to the resource request.

17. The apparatus according to claim 14, wherein the processing circuitry is configured to:

determine a progress of the instance of the cloud game;

determine a to-be-played image that is associated with the progress of the instance of the cloud game; and generate a cutscene data identifier corresponding to the to-be-played image, the cutscene data identifier being included in the cutscene identification information.

18. The apparatus according to claim 14, wherein the processing circuitry is configured to:

generate the cutscene data, and send the cutscene data and the cutscene identification information to the cutscene server, the cutscene server being configured to store the cutscene data in association with the cutscene identification information.

19. The apparatus according to claim 14, wherein cutscene includes a dialogue cutscene, and the processing circuitry is configured to:

generate dialogue cutscene data corresponding to the cutscene identification information, the dialogue cutscene data including a plurality of pictures and playback information indicating an order in which the plurality of pictures is to be displayed; and send the plurality of pictures, the playback information, and the cutscene identification information to the cutscene server, the cutscene server being configured to store the dialogue cutscene data and the playback information in association with the cutscene identification information.

20. A system, comprising:

the apparatus according to claim 14; and the cutscene server.

* * * * *